(12) United States Patent
Mazumdar (10) Patent No.: US 10,761,846 B2
(45) Date of Patent: Sep. 1, 2020

(54) METHOD FOR MANAGING SOFTWARE THREADS DEPENDENT ON CONDITION VARIABLES

(71) Applicant: Oracle International Corporation, Redwood Shores, CA (US)

(72) Inventor: Subhra Mazumdar, San Jose, CA (US)

(73) Assignee: Oracle International Corporation, Redwood Shores, CA (US)

(*) Notice: Subject to any disclaimer, the term of this patent is extended or adjusted under 35 U.S.C. 154(b) by 37 days.

(21) Appl. No.: 16/252,342

(22) Filed: Jan. 18, 2019

(65) Prior Publication Data

US 2019/0171453 A1 Jun. 6, 2019

Related U.S. Application Data

(63) Continuation of application No. 15/141,428, filed on Apr. 28, 2016, now Pat. No. 10,185,564.

(51) Int. Cl.
*G06F 9/30* (2018.01)
*G06F 9/38* (2018.01)

(52) U.S. Cl.
CPC ........ *G06F 9/3009* (2013.01); *G06F 9/30079* (2013.01); *G06F 9/30094* (2013.01); *G06F 9/3851* (2013.01)

(58) Field of Classification Search
None
See application file for complete search history.

(56) References Cited

U.S. PATENT DOCUMENTS 5,515,538 A * 5/1996 Kleiman ............... G06F 9/4812
710/260
6,035,374 A 3/2000 Panwar et al.
(Continued)

FOREIGN PATENT DOCUMENTS

CN 102566979 7/2012
CN 103530197 A * 1/2014

OTHER PUBLICATIONS

'Multithreaded Programming (POSIX pthreads Tutorial)' by Alfred Park at randu.org, archive from Mar. 3, 2016. (Year: 2016).*
(Continued)

*Primary Examiner* — Steven G Snyder
(74) *Attorney, Agent, or Firm* — Kowert, Hood, Munyon, Rankin & Goetzel, P.C.

(57) ABSTRACT

An apparatus includes a buffer, a sequencing circuit, and an execution unit. The buffer may be configured to store a plurality of instructions. Each of the plurality of instructions may be in a first thread. In response to determining that the first instruction depends on the value of a condition variable and to determining that a count value is below a predetermined threshold, the sequencing circuit may be configured to add a wait instruction before the first instruction. The execution unit may be configured to delay execution of the first instruction for an amount of time after executing the wait instruction. The sequencing circuit may be further configured to maintain the plurality of instructions in the first buffer after executing the wait instruction, and to decrement the count value in response to determining that the value of the condition variable is updated within the amount of time.

20 Claims, 8 Drawing Sheets

(56) References Cited

U.S. PATENT DOCUMENTS

| | | | | |
|---|---|---|---|---|
| 6,101,524 | A * | 8/2000 | Choi | G06F 9/52 710/264 |
| 6,237,019 | B1 * | 5/2001 | Ault | G06F 9/52 718/100 |
| 6,631,409 | B1 * | 10/2003 | Watson | H04L 43/00 709/223 |
| 7,140,022 | B2 * | 11/2006 | Binns | G06F 9/4887 718/105 |
| 7,302,685 | B2 * | 11/2007 | Binns | G06F 9/4887 370/415 |
| 7,437,519 | B2 * | 10/2008 | Kiyota | G06F 9/3004 711/141 |
| 7,640,384 | B2 | 12/2009 | Hammarlund | |
| 7,853,756 | B2 * | 12/2010 | Ukai | G06F 9/3004 711/141 |
| 8,413,163 | B2 * | 4/2013 | Hayashi | G06F 9/3851 710/260 |
| 8,464,035 | B2 | 6/2013 | Dixon | |
| 8,589,933 | B2 * | 11/2013 | Solihin | G06F 9/3004 718/102 |
| 8,713,262 | B2 * | 4/2014 | Overby | G06F 9/52 711/133 |
| 8,775,837 | B2 | 7/2014 | Dice | |
| 9,003,421 | B2 | 4/2015 | Gabor | |
| 9,081,687 | B2 | 7/2015 | Offen | |
| 10,185,564 | B2 * | 1/2019 | Mazumdar | G06F 9/3009 |
| 10,620,681 | B2 * | 4/2020 | Berthier | G06F 1/329 |
| 2002/0120661 | A1 * | 8/2002 | Binns | G06F 9/4887 718/102 |
| 2002/0120663 | A1 * | 8/2002 | Binns | G06F 9/4887 718/103 |
| 2004/0128489 | A1 * | 7/2004 | Wang | G06F 9/544 712/235 |
| 2005/0022196 | A1 | 1/2005 | Davis et al. | |
| 2005/0246506 | A1 * | 11/2005 | Ukai | G06F 9/52 711/152 |
| 2006/0161735 | A1 * | 7/2006 | Kiyota | G06F 12/0815 711/129 |
| 2006/0288192 | A1 | 12/2006 | Abernathy et al. | |
| 2008/0028415 | A1 * | 1/2008 | Binns | G06F 9/4887 718/107 |
| 2009/0059951 | A1 * | 3/2009 | Hayashi | G06F 13/24 370/458 |
| 2010/0274992 | A1 | 10/2010 | Chou et al. | |
| 2011/0067011 | A1 * | 3/2011 | Wang | G06F 9/52 717/140 |
| 2012/0096239 | A1 * | 4/2012 | Solihin | G06F 9/4893 712/205 |
| 2013/0061005 | A1 * | 3/2013 | Overby | G06F 1/3206 711/151 |
| 2014/0075163 | A1 | 3/2014 | Loewenstein | |
| 2017/0228233 | A1 * | 8/2017 | Mishaeli | G06F 9/3009 |
| 2017/0315806 | A1 * | 11/2017 | Mazumdar | G06F 9/3009 |
| 2017/0357505 | A1 * | 12/2017 | Berthier | G06F 9/30101 |

OTHER PUBLICATIONS

Anastopoulos, et al; "Facilitating Efficient Synchronization of Asymmetric Threads on Hyper-Threaded Processors"; IEEE International Symposium on Parallel and Distributed Processing, Miami, Florida; Apr. 14-18, 2008. IPDPS 2008. http://www.cslab.ece.ntua.gr/~nkoziris/papers/mtaap08facilitating.pdf.

Vouk; "Buddy Threading in Distributed Applications on Simultaneous Multi-Threading Processors"; PhD Thesis; Department of Computer Science, Raleigh, North California; 2005; http://moss.csc.ncsu.edu/~mueller/ftp/pub/mueller/theses/nvouk-th.pdf.

Somlo; "Handling of Guest-Mode MONITOR and MWAIT"; Carnegie Mellon University; Feb. 5, 2014; http://www.contrib.andrew.cmu.edu/~somlo/OSXKVM/mwait.html.

* cited by examiner

| Fetch Buffer 401 | | |
|---|---|---|
| Thread 410 | Thread 420 | Thread 430 |
| Instruction 410e | Instruction 420e | Instruction 430e |
| Instruction 410f | Instruction 420f | Instruction 430f |
| Instruction 410g | Instruction 420g | Instruction 430g |
| Instruction 410h | Instruction 420h | Instruction 430h |
| ⋮ | ⋮ | ⋮ |

| Pick Queue 403 | | |
|---|---|---|
| Thread 410 | Thread 420 | Thread 430 |
| MWAIT | Instruction 420a | Instruction 430a |
| Instruction 410a | Instruction 420b | Instruction 430b |
| Instruction 410b | Instruction 420c | Instruction 430c |
| Instruction 410c | Instruction 420d | Instruction 430d |
| Instruction 410d | | |
| ⋮ | ⋮ | ⋮ |

| Condition Variable 407 |
|---|
| 0 |

| Sleep Buffer 405 |
|---|
| empty |
| empty |
| empty |
| empty |
| empty |
| empty |
| ⋮ |

| Count Value 409 |
|---|
| < Threshold |

FIG. 4

| Fetch Buffer 401 |||
|---|---|---|
| Thread 440 | Thread 420 | Thread 430 |
| Instruction 440e | Instruction 420e | Instruction 430e |
| Instruction 440f | Instruction 420f | Instruction 430f |
| Instruction 440g | Instruction 420g | Instruction 430g |
| Instruction 440h | Instruction 420h | Instruction 430h |
| ⋮ | ⋮ | ⋮ |

| Pick Queue 403 |||
|---|---|---|
| Thread 440 | Thread 420 | Thread 430 |
| Instruction 440a | Instruction 420a | Instruction 430a |
| Instruction 440b | Instruction 420b | Instruction 430b |
| Instruction 440c | Instruction 420c | Instruction 430c |
| Instruction 440d | Instruction 420d | Instruction 430d |
| ⋮ | ⋮ | ⋮ |

| Condition Variable 407 |
|---|
| 0 |

| Count Value 409 |
|---|
| > Threshold |

| Sleep Buffer 405 |
|---|
| Thread 410 |
| Instruction 410a |
| Instruction 410b |
| Instruction 410c |
| Instruction 410d |
| Instruction 410e |
| Instruction 410f |
| Instruction 410g |
| Instruction 410h |

METHOD FOR MANAGING SOFTWARE THREADS DEPENDENT ON CONDITION VARIABLES

The present application is a continuation of U.S. application Ser. No. 15/141,428 filed Apr. 28, 2016 (now U.S. Pat. No. 10,185,564); the disclosure of which is incorporated by reference herein in its entirety.

BACKGROUND

Field of the Invention

The embodiments herein relate to processors and, more particularly, to a method for thread selection at various stages of a processing pipeline in a processing core.

Description of the Related Art

Some processors include one or more cores that support multi-threaded instruction execution. In a multi-threaded core, at least some hardware resources within the core may be shared between two or more software threads by assigning the resources to a currently selected thread. The selected thread may change on a given core clock cycle, allowing another thread access to the core's hardware resources. As used herein, a "software thread," "execution thread," or simply "a thread," refers to a smallest portion of a software application or process that may be managed independently by a core. Multi-threaded operation may allow a core to utilize processor resources more efficiently. For example, if an instruction in a first thread is waiting for a result of a memory access, processor resources may be assigned to a second thread rather than waiting for the result.

One particular hardware resource that may be shared is the instruction processing pipeline, or as referred to herein, "the processing pipeline." The processing pipeline of a multi-threaded core may concurrently include instructions for two or more threads. During processing, an active thread may be dependent on an occurrence of an event to continue processing. For example, a given thread may be reading data received via a communications interface. Processing of the thread may be temporarily suspended or paused if the thread must wait for a data value to be received. How a thread is managed when waiting for an event to occur may impact performance of the core.

SUMMARY

Various embodiments of a system, a method and an apparatus are disclosed in which an embodiment of the apparatus includes a first buffer, a sequencing circuit, and an execution unit. The first buffer may be configured to store a plurality of instructions wherein each instruction of the plurality of instructions may be included in a first thread of a plurality of threads, and wherein each instruction that is included in the first thread may be arranged in an order of execution in the first buffer. The sequencing circuit may be configured to determine that a first instruction of the plurality of instructions depends on a value of a condition variable, and to add a wait instruction to the first buffer before the first instruction in the order of execution in response to the determination that the first instruction depends on the value of the condition variable and a determination that a count value is below a predetermined threshold. The execution unit may be configured to delay execution of the first instruction for an amount of time in response to execution of the wait instruction. The sequencing circuit may also be configured to maintain the plurality of instructions in the first buffer in response to the execution of the wait instruction, and to decrement the count value in response to a determination that the value of the condition variable is updated within the amount of time.

In a further embodiment, the sequencing circuit may be further configured to increment the count value in response to a determination that the value of the condition variable remains the same during the amount of time. In another embodiment, the sequencing circuit may be further configured to determine that a second instruction of the plurality of instructions depends upon the value of the condition variable, and to add a sleep instruction to the first buffer in response to the determination that the second instruction depends upon the value of the condition variable and a determination that the count value is above the predetermined threshold. The sleep instruction may be added before the second instruction in the order of execution.

In one embodiment, the sequencing circuit may be further configured to move the plurality of instructions from the first buffer to a second buffer in response to an execution of the sleep instruction. In a further embodiment, the execution unit may be further configured to execute instructions included in a second thread of the plurality of threads in response to the move of the plurality of instructions.

In another embodiment, the execution unit may be further configured to monitor the value of the condition variable in response to execution of the wait instruction, and to execute the first instruction in response to a determination that the value of the condition variable has changed. In an embodiment, the wait instruction may include an operand, and wherein to delay the execution of the first instruction for the amount of time the execution unit may be further configured to delay for a length of time dependent upon a value of the operand.

BRIEF DESCRIPTION OF THE DRAWINGS

The following detailed description makes reference to the accompanying drawings, which are now briefly described.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Generally speaking, a processor core (or simply, a "core") may refer to a unit of a processor that is capable of executing program instructions and processing data independently of other cores within the processor, such that multiple cores may execute instructions concurrently. Performance of a processing core may be impacted by a multitude of factors, including processor clock speed, a number of cores included in the processor, and speed of the memory accesses. One method for improving performance is by using cores capable of multi-threaded processing. In a multi-threaded core, two or more threads may share hardware resources within the core by assigning the resources to a currently selected thread, allowing a core to utilize processor resources more efficiently.

The processing pipeline of a multi-threaded core may concurrently include instructions and data for two or more threads. These two or more threads are referred to herein as being "on CPU" while their corresponding instructions are in the processing pipeline. A thread that stalls, i.e., cannot continue due to waiting for an event to occur, may be taken "off CPU" by moving instructions that are included in the thread out of the processing pipeline and into buffers for storage until a time when the thread may be able to proceed. The process of moving a thread from an on CPU state to an off CPU state may take some amount of processing cycles and therefore, may negatively impact the performance of the core if the thread is only taken off CPU for a short time and is summarily put back on CPU after, for example, only a few processing cycles. To the contrary, if a stalled thread is kept on CPU for many processing cycles, core performance may also be negatively impacted.

Systems and methods for evaluating conditions for keeping a stalled thread on CPU are desired. Embodiments of a method and a system for determining if a stalled thread is kept on CPU or moved off CPU are contemplated herein.

Figure 1:
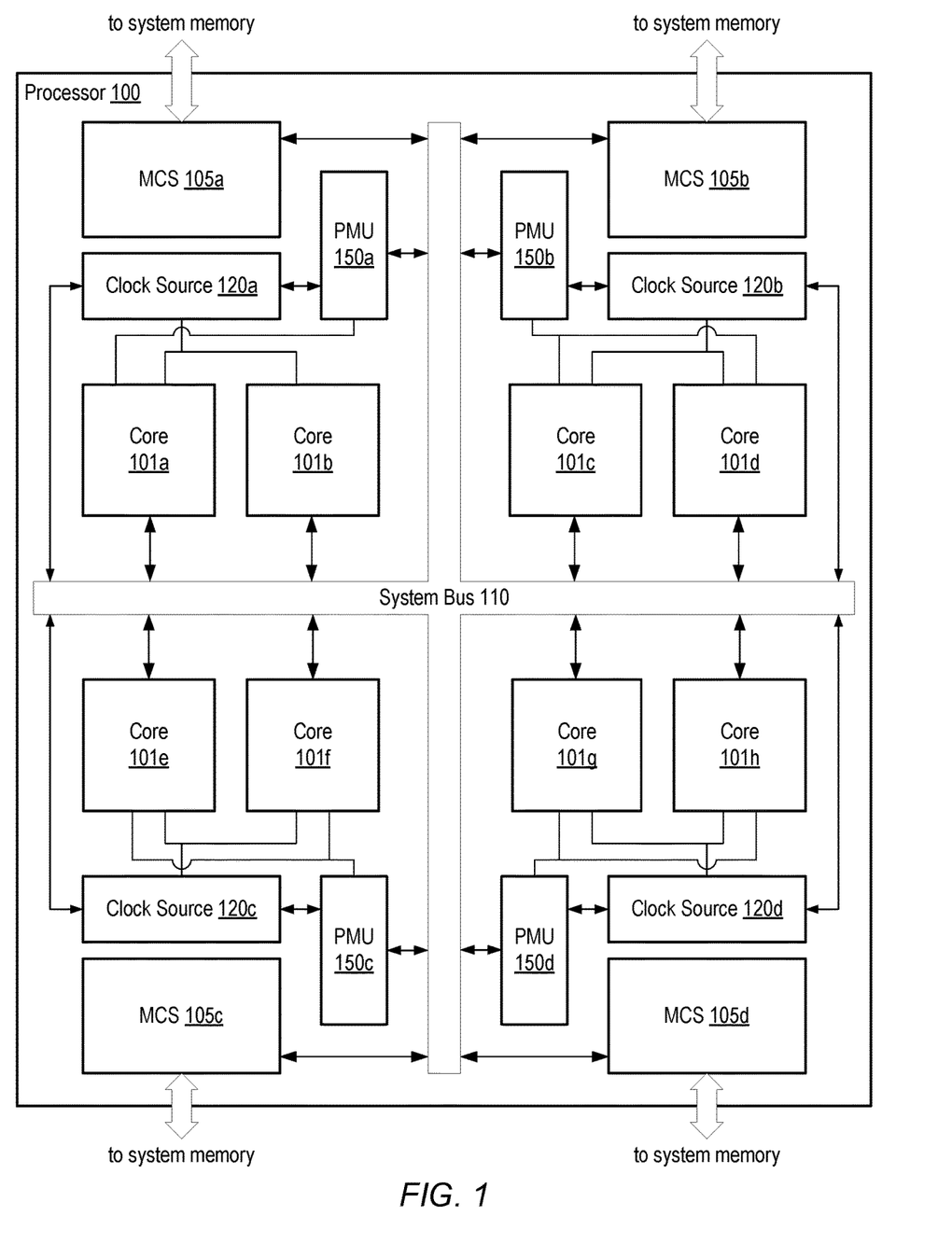
FIG. 1 illustrates a block diagram of embodiment of a multicore processor.

In various embodiments, a multicore processor may include a number of instances of a core, as well as other features. One example of an eight core processor is depicted in FIG. 1. In the illustrated embodiment, processor 100 includes eight instances of a core, denoted as cores 101a-h. Cores 101a-h are each coupled to system bus 110. Four Memory Controller Systems, labeled as MCS 105a-d, are also coupled to system bus 110 as well as including off-chip connections to available system memories. Four clock sources, denoted as clock sources 120a-d, and four power management units, denoted as PMU 150a-d, are each coupled to corresponding pairs of cores 101a-h.

Cores 101a-h are configured to execute instructions and to process data according to a particular Instruction Set Architecture (ISA). In the present embodiment, cores 101a-h are configured to implement the SPARC® V9 ISA, although in other embodiments it is contemplated that any desired ISA may be employed, such as x86, ARM®, PowerPC® or MIPS®, for example. Additionally, as described in greater detail below, in the illustrated embodiment, each instance of core 101a-h is configured to execute multiple threads concurrently (referred to herein as "multi-threaded operation"), where each thread may include a set of instructions that may execute independently of instructions from another thread. In various embodiments, it is contemplated that any suitable number of cores 101a-h may be included within a processor, and that cores 101a-h may each concurrently process some number of threads.

Each of cores 101a-h may include multiple subsystems for executing various instructions. In the illustrated embodiment, to support multiple threads, each core includes additional circuits and buffers for managing each active thread. A sequencing unit in each core determines to which thread each instruction belongs and stores the instruction in the corresponding instruction fetch buffer. In some embodiments, each core 101 may include one or more coprocessors to off-load a main execution unit in each core 101. Examples of suitable coprocessors include, for example, floating point units, encryption coprocessors, or digital signal processing engines. Subsets of the ISA may be directed towards an appropriate coprocessor rather than be executed by the execution unit, allowing the execution unit to process other instructions in the ISA.

MCSs 105a-d, in the present embodiment, provide control logic, buffers and interfaces for accessing available memory outside of processor 100. MCSs 105a-d may include any number of interfaces for communication with suitable types of off-chip memory, such as, for example, Dynamic Random Access Memories (DRAMs), Static Random Access Memories (SRAMs), Hard-Disk Drives (HDDs), Solid-State Drives (SSDs), and the like. In various embodiments, each MCS 105 may include circuits for communicating with a different type of memory, or each MCS 105 may include circuits for communicating with multiple types of memory.

System bus 110 may be configured to manage data flow between cores 101a-h and other circuits in processor 100, such as, e.g., clock sources 120a-d, PMUs 150a-d, and other circuits not shown. In one embodiment, system bus 110 may include logic, such as multiplexers or a switch fabric, for example. In some embodiments, system bus 110 may include logic to queue data requests and/or responses, such that requests and responses may not block other activity while waiting for service. It is noted that in various embodiments, system bus 110 may be implemented using any suitable type of interconnect network.

Cores 101a-h may be organized into groups, with the cores of each group physically co-located to share resources such as locally distributed power supply signals and clock signals. In the illustrated embodiment, cores 101a-h may be segmented into groups of two such that each group of cores may occupy roughly one quadrant of an integrated circuit (IC). Each quadrant includes a respective MCS 105a-d, clock source 120a-d, and PMU 150a-d.

In the present embodiment, clock sources 120a-d provide one or more clock signals for the cores 101a-h in the respective quadrant. For example, clock source 120a supplies clock signals for cores 101a and 101b, clock source 120b supplies clock signals for cores 101c and 101d, and so forth. Each clock source 120a-d may provide a clock signal with a same frequency to each of the coupled cores 101, or may be capable of providing independent clock signals to each coupled core 101. Clock signal frequencies may be adjusted through use of local clock divider circuits or by selecting from multiple clock signals through switches or multiplexors.

In the illustrated embodiment, PMUs 150a-d control local distribution of power supply signals within each corresponding quadrant. PMUs 150a-d control voltage levels of one or more power supply signals to the cores 101 in the corresponding quadrant. Voltage levels may be adjusted by use of voltage regulating circuits or by selecting from multiple power supply signals through switches or multiplexors. PMUs 150a-d receive commands to adjust voltage levels from other components in processor 100, such as from one of cores 101a-h or from a corresponding temperature sensing unit 140a-d.

It is noted that FIG. 1 is merely an example of a multicore processor. In other embodiments, processor 100 may include one or more levels of cache memory as well as network interfaces. The physical structure may not be represented by FIG. 1 as many. The organization of FIG. 1 is intended to represent a logical organization of circuits rather than a physical organization, and, in various embodiments, other components may also be employed. Other physical arrangements, therefore, are possible and contemplated.

Figure 2:
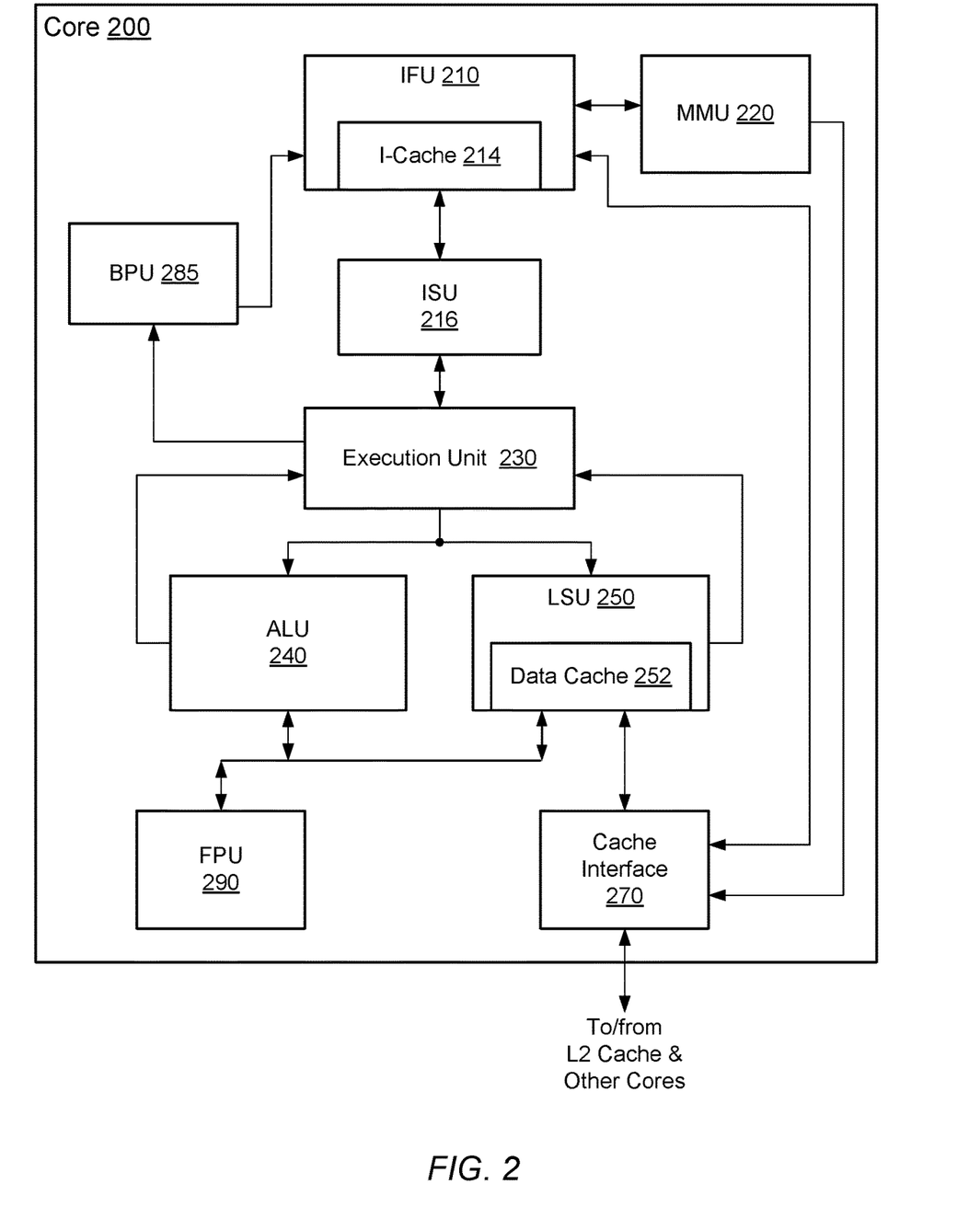
FIG. 2 illustrates a block diagram of an embodiment of a processing core.

Turning to FIG. 2, a block diagram of an embodiment of a core is illustrated. Core 200 includes Instruction Fetch Unit (IFU) 210, coupled to Memory Management Unit (MMU) 220, Branch Prediction Unit (BPU) 285, Cache Interface 270, and Instruction Scheduling Unit (ISU) 216. IFU 210 includes Instruction Cache (I-Cache) 214. ISU 216 is coupled to Execution Unit 230. Execution Unit 230 is coupled to Arithmetic Logic Unit (ALU) 240, and to Load Store Unit (LSU) 250. ALU 240 and LSU 250 are also coupled to send data back to Execution Unit 230. Both ALU 240 and LSU 250 are coupled to Floating Point Unit (FPU) 290. IFU 210, MMU 220, and LSU 250 are coupled to Cache Interface 270.

Instruction Fetch Unit (IFU) 210 may be configured to retrieve instructions for execution in Core 200. In the illustrated embodiment, IFU 210 is configured to perform various operations relating to the fetching of instructions from cache or memory, and the decoding of instructions prior to the instructions being issued for execution. In some embodiments, IFU 210 includes logic to maintain fetch addresses (e.g., derived from program counters) corresponding to each thread being executed by Core 200, and to coordinate the retrieval of instructions from I-Cache 214 according to those fetch addresses. In one embodiment, IFU 210 is configured to maintain a pool of fetched, ready-for-issue instructions drawn from among each of the threads being executed by Core 200. For example, IFU 210 may implement a respective instruction buffer corresponding to each thread in which several recently-fetched instructions from the corresponding thread may be stored.

Instruction Scheduling Unit (ISU) 216 may be configured to retrieve instructions for execution in Core 200. In the illustrated embodiment, ISU 216 is configured to select instructions for various threads from Instruction Cache 214 for execution. In some embodiments, ISU 216 may be configured to select multiple ready-to-issue instructions and concurrently issue the selected instructions to various functional units without constraining the threads from which the issued instructions are selected. In other embodiments, thread-based constraints may be employed to simplify the selection of instructions. For example, threads may be assigned to thread groups for which instruction selection is performed independently (e.g., by selecting a certain number of instructions per thread group without regard to other thread groups). In some embodiments, ISU 216 may be configured to further prepare instructions for execution, for example by detecting scheduling hazards, arbitrating for access to contended resources, or the like. Moreover, in the present embodiment, ISU 216 supports speculative issuing of instructions, i.e., instructions from a given thread may be speculatively issued by ISU 216 for execution depending on, e.g., a history of code execution by Core 200. For example, a load instruction may be speculatively issued by ISU 216 ahead of one or more store instructions that were received previous to receiving the load instruction. ISU 216 may use historical code execution to decide whether or not to issue the load instruction.

Instruction and data memory accesses may involve translating virtual addresses to physical addresses. In some embodiments, MMU 220 may be configured to manage one or more translation tables stored in system memory and to traverse such tables in response to a request for an address translation. In some embodiments, if MMU 220 is unable to derive a valid address translation, for example if one of the memory pages including a page table is not resident in physical memory (i.e., a page miss), MMU 220 may be configured to generate a trap to allow a memory management software routine to handle the translation.

Branch Prediction Unit (BPU) 285 may include logic to predict branch outcomes and/or fetch target addresses. BPU 285 may use a Branch History Table (BHT) to track a number of times an instruction branch is taken versus how often the instruction branch is not taken. BPU 285 may also track patterns of taking or not taking a particular branch. Using the data collected in the BHT, BPU 285 may populate a Branch Target Buffer (BTB) with predictions of branches to be taken or not taken.

Execution Unit 230 may be configured to process and provide results for certain types of instructions issued from ISU 216. In one embodiment, Execution Unit 230 may be configured to execute certain integer-type instructions defined in the implemented ISA, such as arithmetic, logical, and shift instructions. It is contemplated that in some embodiments, Core 200 may include more than one Execution Unit 230, and each of the execution units may or may not be homogenous in functionality. Each Execution Unit 230 may be capable of processing a given thread. In the illustrated embodiment, instructions destined for ALU 240 or LSU 250 pass through execution unit 230. In alternative embodiments, however, it is contemplated that such instructions may be issued directly from ISU 216 to their respective units without passing through execution unit 230.

Arithmetic Logic Unit (ALU) 240 may be configured to execute and provide results for certain arithmetic instructions defined in the implemented ISA. For example, in one embodiment, ALU 240 implements integer arithmetic instructions, such as add, subtract, multiply, divide, and population count instructions. In one embodiment, ALU 240 implements separate processing pipelines for integer add/multiply, divide, and Boolean operations, while in other embodiments the instructions implemented by ALU 240 may be differently partitioned.

In the illustrated embodiment, Floating Point Unit 290 is implemented separately from ALU 240 to process floating-point operations while ALU 240 handles integer and Boolean operations. FPU 290 implements single-precision and double-precision floating-point arithmetic instructions compliant with a version of the Institute of Electrical and Electronics Engineers (IEEE) 754 Standard for Binary Floating-Point Arithmetic (more simply referred to as the IEEE 754 standard), such as add, subtract, multiply, divide, and certain transcendental functions. In other embodiments, ALU 240 and FPU 290 may be implemented as a single logic block.

Load Store Unit (LSU) 250 may be configured to process data memory references, such as integer and floating-point load and store instructions as well as memory requests that may originate from other blocks within Core 200. LSU 250 includes Data Cache 252 as well as logic configured to detect cache misses and to responsively request data from an L2 cache via Cache Interface 270. In one embodiment, Data Cache 252 is configured as a write-through cache in which all stores are written to L2 cache regardless of whether they hit in Data Cache 252; in some such embodiments, stores that miss in Data Cache 252 cause an entry corresponding to the store data to be allocated within Data Cache 252. In other embodiments, Data Cache 252 is implemented as a write-back cache.

A number of functional units in the illustrated embodiment of Core 200 may be configured to generate memory or I/O requests external to core 200. For example, IFU 210 or LSU 250 may generate access requests to an L2 cache in response to their respective cache misses. In the illustrated embodiment, Cache Interface 270 is configured to provide a centralized interface to the port of an L2 cache on behalf of the various functional units that may generate memory accesses. In an embodiment, Cache Interface 270 is also configured to receive data returned via an L2 cache, and to direct such data to the appropriate functional unit (e.g., Data Cache 252 for a data cache fill due to miss). In addition to L2 cache, Cache Interface 270 may, in some embodiments, also be coupled to other cores in a multicore processor.

It is noted that, as used herein, "committing" or to "commit" an instruction refers to processing of an instruction including the instruction being executed, completed, and results of the instruction being saved in an appropriate memory and available for use by a subsequent instruction. In some embodiments, to "commit" an instruction is the same as to "retire" an instruction. In the embodiments presented herein, an instruction is not committed until all previously received instructions have been committed. Accordingly, an instruction issued out-of-order may have to wait until the previous instructions are committed before being committed itself.

The embodiment of the core illustrated in FIG. 2 is one of multiple contemplated examples. Other embodiments of a core may include a different number and configuration of components. For example, ALU 240 and FPU 290 may be implemented as a single functional block rather than two separate units.

Figure 3:
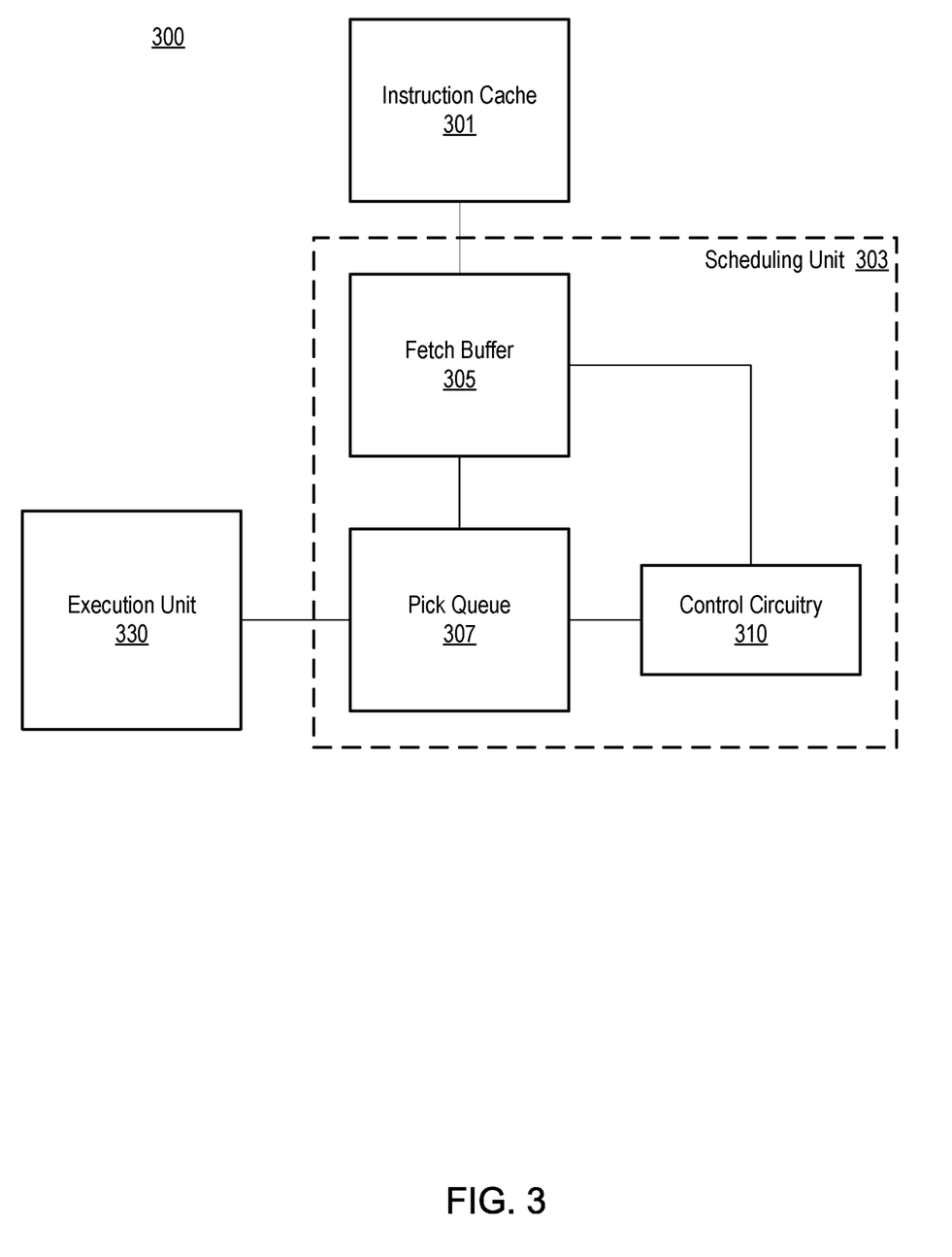
FIG. 3 shows a block diagram of an embodiment of a core's instruction pipeline.

Moving to FIG. 3, a block diagram of an embodiment of a processing pipeline for a multi-threaded core is shown. In various embodiments, processing pipeline 300 may be part of Core 200 in FIG. 2 and includes Instruction Cache 301 coupled to Fetch Buffer 305. Pick Queue 307 is coupled to Fetch Buffer 305, Control Circuitry 310, and Execution Unit 330. In various embodiments, one or more of Fetch Buffer 305, Pick Queue 307, and Control Circuitry 310 may be included within Scheduling Unit 303.

Instruction Cache 301 may correspond to I-Cache 214 in FIG. 2 and, in the current embodiment, corresponds to the functional description provided above. Instruction Cache 301 may store instructions for a plurality of threads. In the current embodiment, the instructions stored in Instruction Cache 301 are processed by Scheduling Unit 303, which, in some embodiments, may correspond to ISU 216 in FIG. 2.

Fetch Buffer 305 stores instructions for a selected thread fetched from Instruction Cache 301. In some embodiments, Fetch Buffer 305 may include a single memory storing multiple fetch buffers, with each fetch buffer storing instructions for a respective thread. In other embodiments, Fetch Buffer 305 may include multiple memories, each memory corresponding to a single fetch buffer for a single respective thread.

In the present embodiment, Control Circuitry 310 picks an instruction for the selected thread from Fetch Buffer 305, decodes the picked instruction and then stores it in Pick Queue 307. Control Circuitry 310 may correspond to a digital logic circuit, a state machine, or a processing circuit. Instructions may be picked from Fetch Buffer 305 in an order that the instructions occur during operation of a program (i.e., in program order). Decoded instructions are stored in Pick Queue 307 in an order that they are to be executed, referred to herein as an order of execution. Upon decoding picked instructions, Control Circuitry 310 may, in some embodiments, store the decoded instructions in a different order in Pick Queue 307 for execution. This different order for storing the instructions may be referred to as out-of-order execution and allows Control Circuitry 310 to rearrange instructions upon determining that out-of-order execution may improve utilization of resources in Core 200. Similar to Fetch Buffer 305, Pick Queue 307 may be implemented as a single memory including multiple queues or multiple memories each including a single queue, or some combination thereof.

Execution Unit 330, which may correspond to Execution Unit 230 in FIG. 2, retrieves a decoded instruction from Scheduling Unit 303 and executes the decoded instructions in the order of execution. After executing the instruction, Execution Unit 330 may, in some embodiments, tag the executed instruction in Pick Queue 307 to signify that it has been executed.

In the current embodiment, to support multiple threads, Control Circuitry 310 selects a thread for processing. In various embodiments, a thread may remain selected for a single processing cycle or for any suitable number of cycles. Instructions included in the selected thread are selected, decoded, and queued for execution by Execution Unit 330. As part of the instruction selection and decoding, Control Circuitry 310 may further prepare instructions for execution by, for example, detecting scheduling hazards or arbitrating for access to contended resources. One such scheduling hazard may include a determination if the selected instruction is dependent upon a value of a condition variable. As used herein, a "condition variable" refers to any hardware register or software defined variable whose value is determined outside of a software thread accessing the value. Examples of condition variables may include core registers, operating system/kernel variables, networking interface registers, and the like.

Values of condition variables may not be predictable by Scheduling Unit 303 and, therefore, software threads dependent upon these variables may present a scheduling hazard. For example, a first thread may be receiving data from a network interface. The first thread waits for a complete data value to be received by the interface and then reads the received value. A condition variable is set by an operating system or a network driver when a data value has been received and is ready to be read. The first thread may be suspended while waiting for the condition variable to update. While the first thread is suspended, Scheduling Unit 303 may switch execution to a second thread to avoid Execution Unit 330 from remaining idle while the first thread is suspended. Switching from the first thread to the second thread may involve some overhead, such as, e.g., copying instructions of the first thread from Fetch Buffer 305 and/or Pick Queue 307 into a sleep buffer to allow the second thread to use those resources. This process of copy the instructions of the first thread may be referred to as "parking" the thread or taking the thread "off CPU." In some embodiments, switching to the second thread may improve an overall processing efficiency of Execution Unit 330, particularly, if the first thread is waiting awhile for the condition variable to update. On the contrary, if the condition variable updates quickly, for example, within a few tens of execution cycles, then the switch from the first thread to the second thread may degrade performance due to the overhead of switching between the two threads.

In the present embodiment, to manage thread switching due condition variables, Scheduling Unit 303 delays taking a thread off CPU (also referred to as keeping the thread "on CPU") upon an initial determination that the thread depends on a condition variable. Scheduling Unit 303 inserts a WAIT instruction in Pick Queue 307 before the instruction that accesses the condition variable. Generally speaking, a WAIT instruction suspends execution of instructions of the thread until an event occurs. In some embodiments, the WAIT instruction may correspond to a Monitored WAIT (MWAIT) instruction in which a memory location is identified as part of the instruction and processing resumes upon a change in value at the identified location. In the present embodiment, the MWAIT instruction includes a value indicating a number of cycles to wait before continuing execution, i.e., a "time out" period. If the condition variable updates before the time out period elapses, then the thread continues execution dependent upon the updated value of the condition variable. If, however, the condition variable does not update before the MWAIT times out, then the thread may be taken off CPU. Scheduling Unit 303 monitors occurrences of the MWAIT instruction and counts a number of times the condition variable is updated before the time out elapses. Scheduling Unit 303 may use this count value to determine if a given thread should be kept on CPU upon an occurrence of a condition variable due to a high success rate of the condition variable updating within the time out period, or taken off CPU due to a low success rate. Further examples of keeping a thread on CPU and taking a thread off CPU are disclosed below.

It is noted that FIG. 3 is merely an example. Although Fetch Buffer 305 and Pick Queue 307 are shown as part Scheduling Unit 303, each may be separate from, but coupled to, Scheduling Unit 303. Additional functional units may be included in other embodiments.

Figure 4:
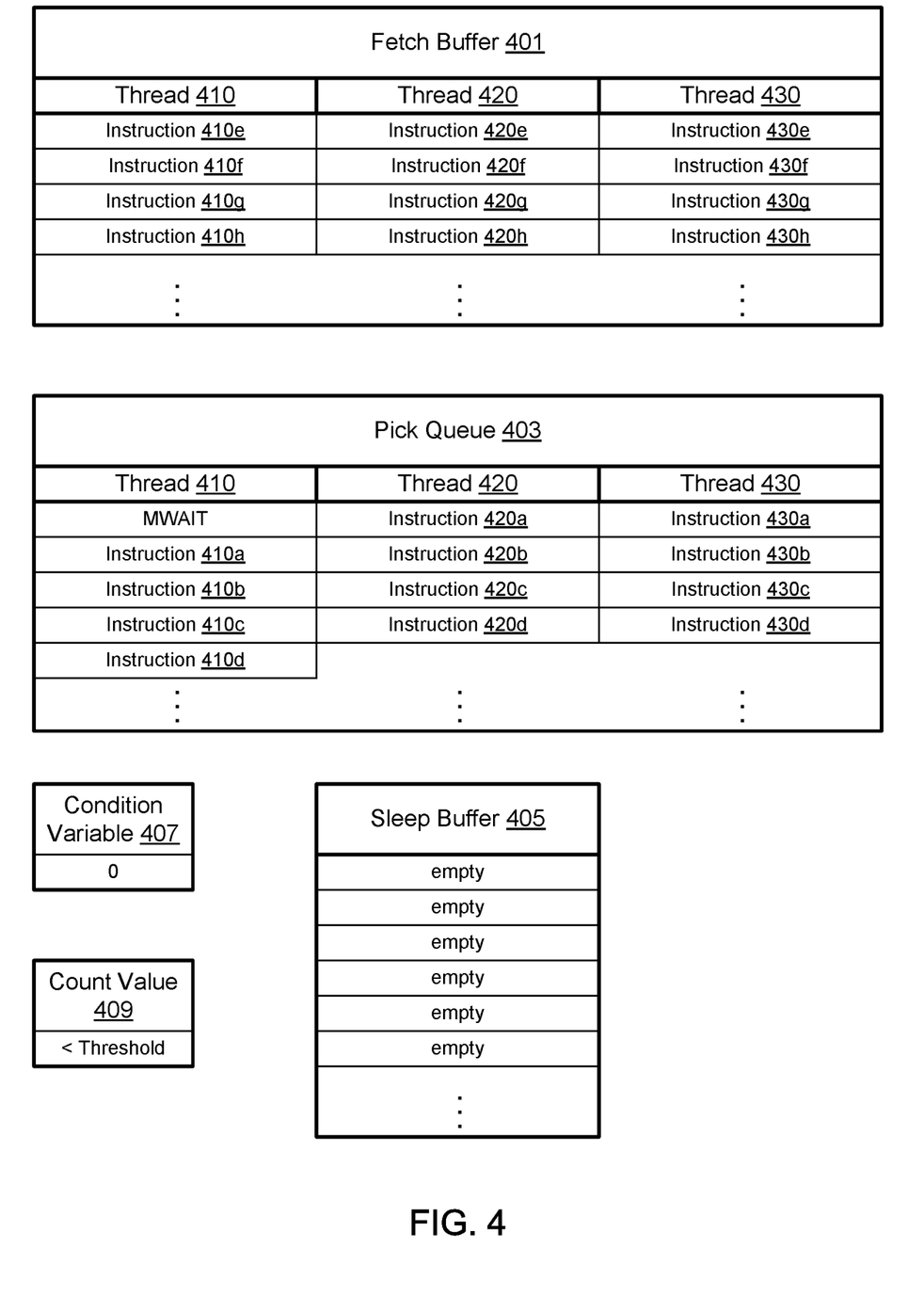
FIG. 4 shows an embodiment of tables representing various buffers, queues, and registers associated with a processing pipeline.

Turning now to FIG. 4, an embodiment of tables representing various buffers, queues, and registers associated with a processing pipeline is illustrated. Tables of FIG. 4 include Fetch Buffer 401, Pick Queue 403, Sleep Buffer 405, Condition Variable 407, and Count Value 409, and may be a part of Processing Pipeline 300 of FIG. 3. Both Fetch Buffer 401 and Pick Queue 403 include multiple instructions included in three threads: Thread 410 including Instructions 410*a-h*, Thread 420 including Instructions 420*a-h*, and Thread 430 including Instructions 430*a-h*.

In the present embodiment, Fetch Buffer 401 and Pick Queue 403 correspond to Fetch Buffer 305 and Pick Queue 307, respectively, and each operates as described above. Each of Fetch Buffer 401 and Pick Queue 403 are storing instructions from each of Threads 410, 420 and 430. For any given processing cycle, any one of Threads 410, 420 and 430 may be active.

Sleep Buffer 405, in the illustrated embodiment, is used by Scheduling Unit 303 to store previously fetched instructions awaiting processing by Execution Unit 330, when the associated thread is taken off CPU. Sleep Buffer 405 may include any suitable type of memory, such as, for example, SRAM or registers, and may include enough entries to hold instructions being stored in Fetch Buffer 401 and Pick Queue 403 associated with a common thread.

Condition Variable 407, in various embodiments, may correspond to a core register, a register in a functional block (e.g., network interface, communications interface, direct memory access (DMA) module, and the like), or a software variable defined by an operating system or software driver. Condition Variable 407 may, therefore, be located in a processing core such as Processing Core 200 in FIG. 2, elsewhere in a processor such as Processor 100 in FIG. 1, or external to Processor 100, such as in DRAM coupled to Processor 100 in a system. Although FIG. 4 includes only one condition variable, any suitable number of condition variables may be included in various embodiments. A value for Condition Variable 407 may be determined by software hardware or a combination of the two. The value of Condition Variable 407 may be updated in response to an event, such as, for example, reception of data via a network interface, a buffer reaching a predetermined level of storage (e.g., a buffer full or buffer empty event), input from a user interface (e.g., keyboard or mouse), a sensor reaching a predetermined threshold (e.g., a temperature sensor), and similar events. Accordingly, some events may occur at predictable intervals, while other events may occur more randomly.

Count Value 409, in the present embodiment, is a variable used to track a number of times Condition Variable 407 updates before an executed MWAIT instruction times out. In various embodiments, Count Value 409 may be incremented or decremented in response to an executed MWAIT instruction timing out before Condition Variable 407 updates. In the illustrated embodiment, Condition Variable 407 is incremented in response to an executed MWAIT timing out before an update to Condition Variable 407. In systems with multiple condition variables, each condition variable may have a corresponding count value.

Scheduling Unit 303 uses Count Value 409 to determine if an active thread that is dependent upon Condition Variable 407 is to be suspended using an MWAIT instruction or taken off CPU using Sleep Buffer 405. In the illustrated example, Thread 410 is active and is dependent upon Condition Variable 407. Scheduling Unit 303 determines that Instruction 410*a* depends upon the value of Condition Variable 407, and compares Count Value 409 to a predetermined threshold value. In the present embodiment, Count Value 409 is less than the threshold value, and as a result, Scheduling Unit 303 inserts an MWAIT instruction before Instruction 410*a*. The MWAIT instruction includes an address identifying Condition Variable 407 and a predetermined amount of time corresponding to the time out period. Thread 410 remains on CPU, although, in some embodiments, instructions included in Thread 420 or 430 may be executed by Execution Unit 330 while the MWAIT instruction suspends execution of Instruction 410*a*. If the value of Condition Variable 407 changes before the MWAIT time out period elapses, then Instruction 410*a* executes dependent upon the updated value of Condition Variable 407. Otherwise, if the time period elapses before the value of Condition Variable 407 changes, then Thread 410 may be taken off CPU and parked in Sleep Buffer 405. In some embodiments, a SLEEP instruction may be inserted before Instruction 410*a* to facilitate taking Thread 410 off CPU.

It is noted that each table of Fetch Buffer 401, Pick Queue 403, Sleep Buffer 405, Condition Variable 407, and Count Value 409 may be stored in any suitable type of memory, such as, e.g., SRAM, DRAM, registers, or combination thereof. In some embodiments, any suitable combination of these tables may be stored in a same memory array.

It is further noted that FIG. 4 is merely an example to demonstrate operation of an embodiment of a processing pipeline. In other embodiments, additional buffers, queues, and registers may be included. Although three threads and one condition variable are illustrated, any suitable number of threads and condition variables may be included in other embodiments.

Figure 5:
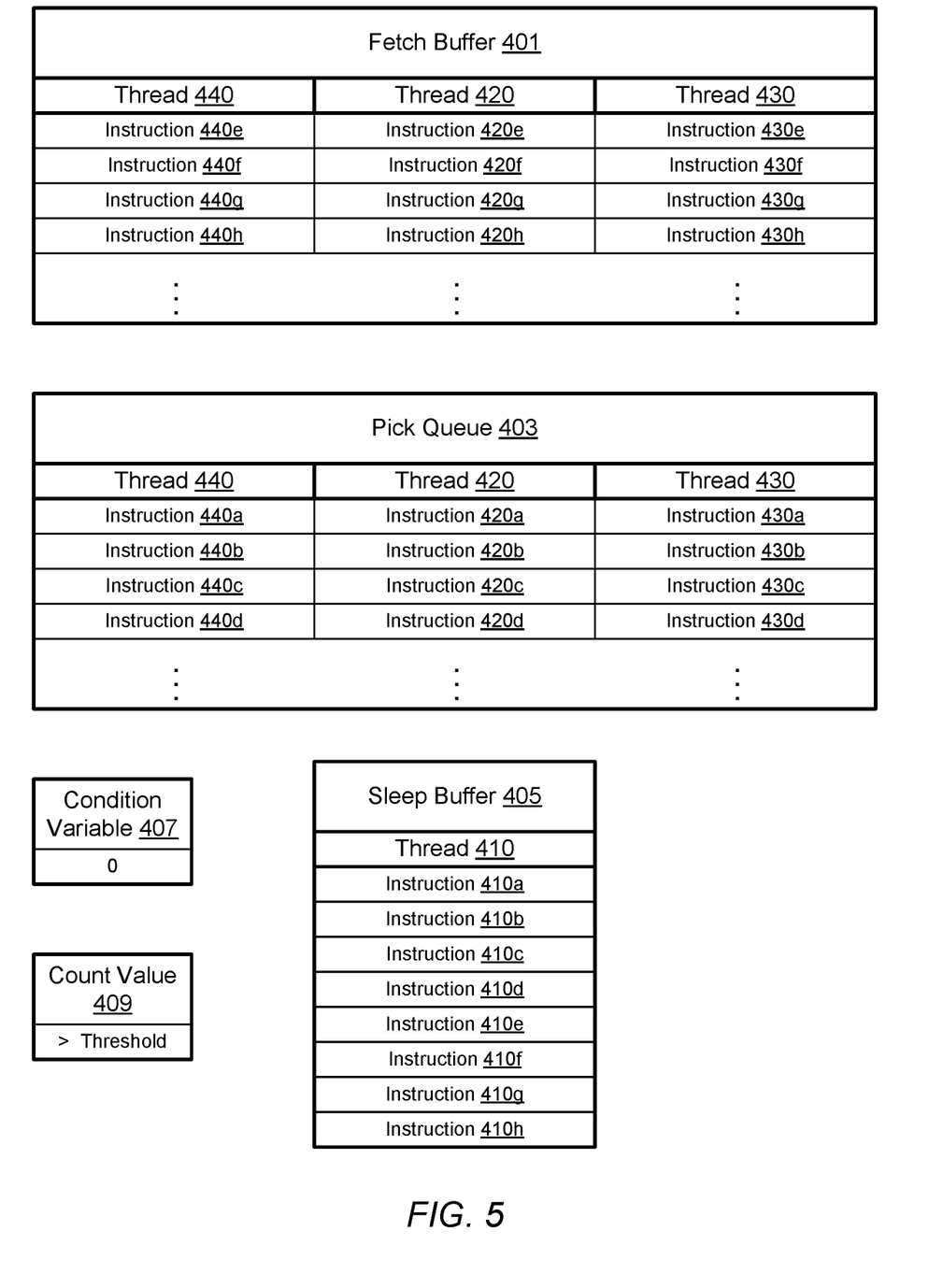
FIG. 5 illustrates a second embodiment of tables representing various buffers, queues, and registers associated with a processing pipeline.

Moving now to FIG. 5, a second embodiment of tables representing various buffers, queues, and registers associated with a processing pipeline are shown. In the illustrated embodiment, the tables of FIG. 5 correspond to the tables of FIG. 4. The tables in the embodiment of FIG. 5, however, demonstrate a different set of conditions associated with Processing Pipeline 300 of FIG. 3. Processing Pipeline 300 is included in a core, such as Core 200 of FIG. 2.

In the illustrated embodiment, Count Value 409 is greater than the threshold value. Scheduling Unit 303 again determines that of Thread 410 depends on the value of Condition Variable 407, and more specifically, that execution of Instruction 410*a* depends on Condition Variable 407. Count Value 409 is compared to the threshold, and Scheduling Unit 303 determines that, since Count Value 409 exceeds the threshold value, that Thread 410 is to be taken off CPU and parked in Sleep Buffer 405. In some embodiments, Scheduling nit 303 inserts a SLEEP instruction in Pick Queue 403 before Instruction 410*a* which, in turn, causes Instructions 410*a*-410*h* to be copied into Sleep Buffer 405. Entries in Fetch Buffer 401 and Pick Queue 403 which held Instructions 410*a*-410*h*, may now be used to store Instructions 440*a*-440*h* included in Thread 440. Any of Threads 420-440 may be active while Thread 410 is off CPU.

A change in the value of Condition Variable 407 may correspond to an interrupt or other signal that is detected by Core 200. Detection of the change in the value of Condition Variable 407 may result in Scheduling Unit 303 reactivating Thread 410. In various embodiments, Scheduling Unit 303 may replace Thread 440 with Thread 410, replace a lowest priority thread of Threads 420-440 with Thread 410, or wait until Fetch Buffer 401 and Pick Queue 403 have available entries for holding Thread 410, such as, for example, upon retirement of Instructions 440*a*-440*h*. Once Instructions 410*a*-410*h* of Thread 410 are restored to Fetch Buffer 401 and Pick Queue 403, Instruction 410*a* may be executed dependent upon the updated value of Condition Variable 407.

It is noted that the tables of FIG. 5 are examples for demonstration purposes. Although three threads are illustrated, any suitable number of threads may be included. The number of entries in the fetch buffers, pick queues, or sleep buffer may be higher or lower than what is illustrated.

Figure 6:
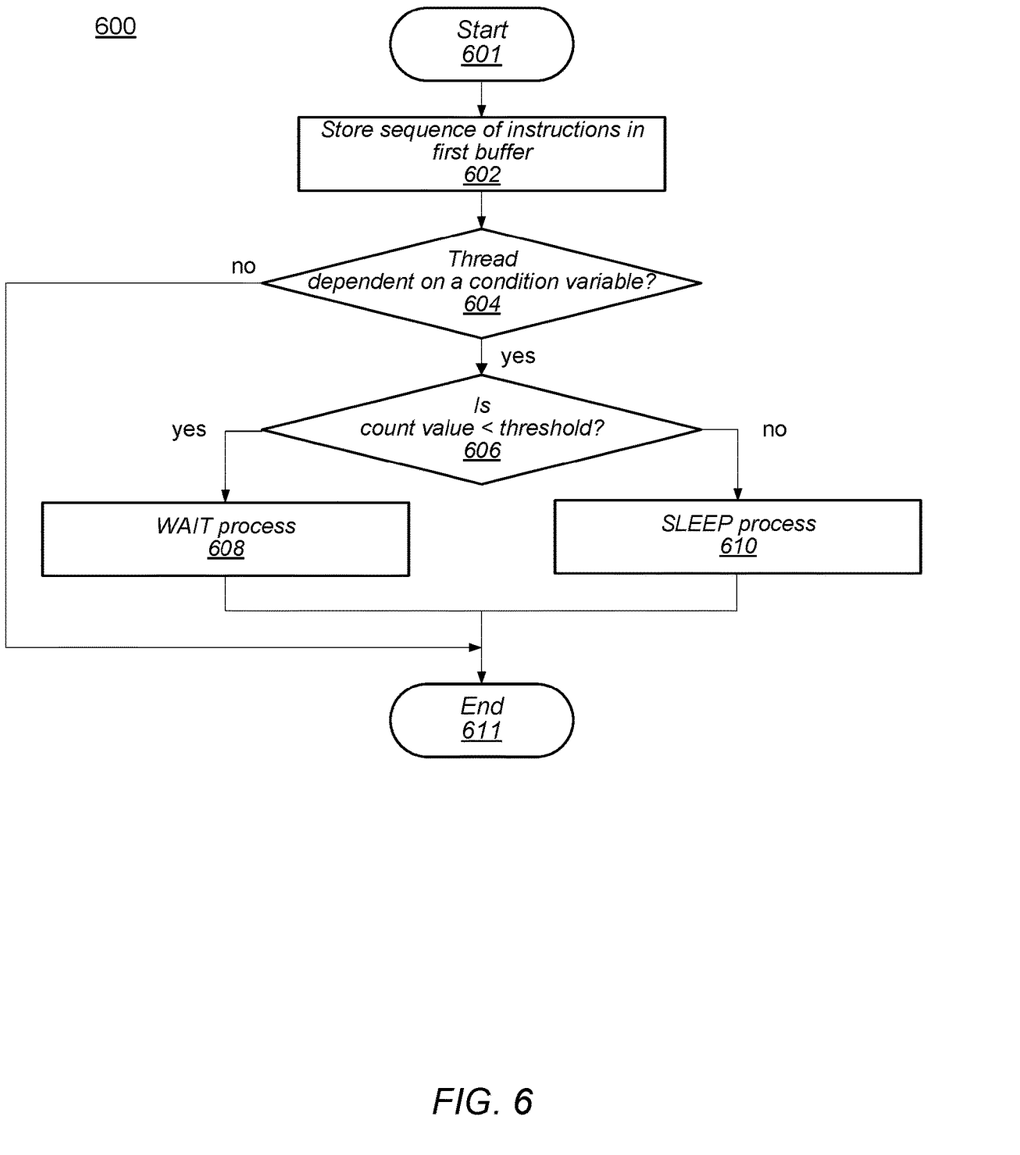
FIG. 6 shows a flow diagram illustrating an embodiment of a method for managing execution of a given thread.

Turning to FIG. 6, a flow diagram of an embodiment of a method for managing execution of a given thread in a multi-threaded core is shown. Method 600 may be applied to a processing core, such as Core 200 in FIG. 2, including Processing Pipeline 300 of FIG. 3. Referring collectively to FIG. 2, FIG. 3, and the flow diagram of FIG. 6, Method 600 begins in block 601.

A sequence of instructions is stored in a first buffer (block 602). In the illustrated embodiment, Control Circuitry 310 fetches instructions from Instruction Cache 301 and stores them in Fetch Buffer 305. The instructions belong to a first thread, although instructions from another thread may already be stored in Fetch Buffer 305. Control Circuitry 310 further decodes instructions of the first thread and moves them into Pick Queue 307.

Further operations of Method 600 may depend upon a determination if the first thread is dependent on a condition variable (block 604). As part of moving instructions of the first thread into Pick Queue 307, Control Circuitry determines if any instruction has associated scheduling conflicts, including if any instruction is dependent upon a condition variable. If the fetched and decoded instructions of the first thread are not dependent on a condition variable, then the method ends in block 611. Otherwise, the method moves to block 606 to evaluate a count value.

Additional operations of Method 600 may depend on a current count value (block 606). In response to determining that the first thread depends on a condition variable, Control Circuitry 310 compares a current count value to a predetermined threshold. The count value is based on a number of times an MWAIT instruction has timed out before a value of the condition variable changes. If the current count value is less than the threshold value, then the method moves to block 608 to perform a WAIT process. Otherwise, the method moves to block 610 to perform a SLEEP process. In other embodiments, it is contemplated that the count value may be determined such that the WAIT process is performed if the count value is greater than the threshold value, and vice versa for the SLEEP process.

If the count value is less than the threshold, then the WAIT process is performed (block 608). In the illustrated embodiment, Control Circuitry 310 inserts an MWAIT instruction before the instruction that is dependent upon the condition variable. The first thread is kept on CPU for at least a predetermined time period while waiting for a change in the condition variable. In some embodiments, a second thread with instructions stored in Pick Queue 307 may be activated while the first thread is waiting on a change in the condition variable. The WAIT process is described in more detail below. The method ends in block 611.

If the count value is greater than the threshold, then the SLEEP process is performed (block 608). In the illustrated embodiment, Control Circuitry 310 inserts a SLEEP instruction before the instruction that is dependent upon the condition variable. The first thread is moved off CPU while waiting for a change in the condition variable. A third thread may be activated during the SLEEP period of the first thread. Further details of the SLEEP process are provided below. The method ends in block 611.

It is noted that the method illustrated in FIG. 6 is an example embodiment. In other embodiments, some of the operations may be performed in parallel or in a different sequence. Various embodiments may include more or fewer operations than illustrated.

Figure 7:
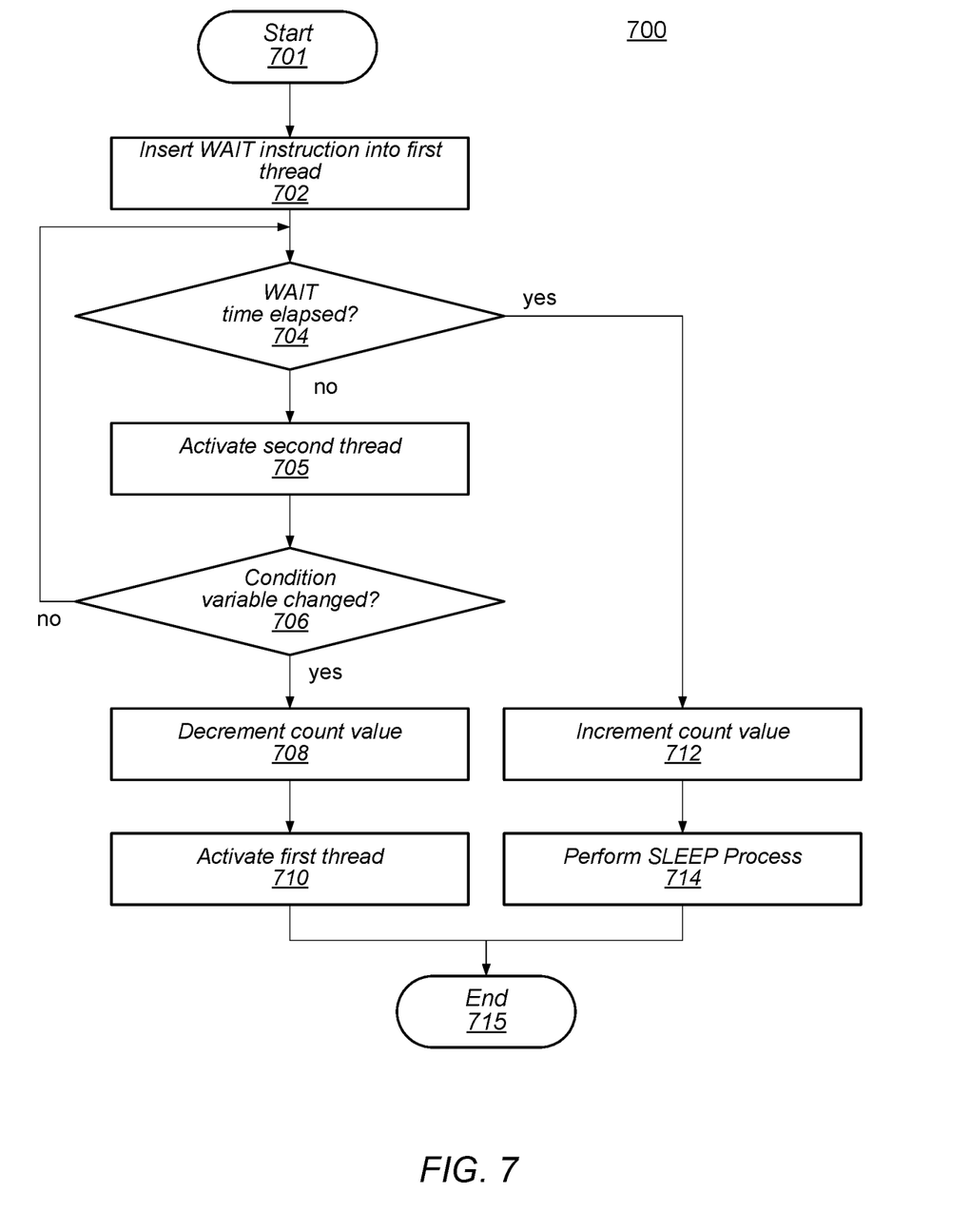
FIG. 7 illustrates a flow diagram of an embodiment of a method for suspending execution of instructions in a given thread.

Moving to FIG. 7, a flow diagram of an embodiment of a method for suspending execution of instructions in a given thread is illustrated. Method 700 discloses a process for suspending a thread from executing for a predetermined time period in a multi-threaded core. Method 600 may be applied to a processing pipeline, such as, for example, Processing Pipeline 300 in FIG. 3. Method 700 may correspond to block 608 of Method 600 in FIG. 6. Referring collectively to processing pipeline 300 in FIG. 3 and the flow diagram of FIG. 7, Method 700 begins in block 701.

A WAIT instruction is inserted into a first thread (block 702). Control logic, such as, e.g., Control Circuitry 310, after a determination that the first thread is dependent upon a condition variable, inserts a WAIT instruction, such as an MWAIT instruction, before an instruction included in the first thread that accesses the condition variable. The MWAIT instruction includes an address of the condition variable and a value for a time out period.

Further operations of Method 700 may depend on an elapsed time from execution of the MWAIT instruction (block 704). Upon execution of the MWAIT instruction, an elapsed time is tracked in the present embodiment. If the elapsed time has not reached the time out period included in the MWAIT instruction, then the method moves to block 705 to activate a second thread. Otherwise, Method 700 moves to block 712 to increment a count value.

If the time out period has not elapsed, then a second thread is activated (block 705). In the illustrated embodiment, while the first thread is waiting for a value of the condition variable to change, Control Circuitry 310 may activate a second thread that currently on CPU, e.g., a second thread including instructions that have already been stored in Fetch Buffer 305 and Pick Queue 307 and therefore ready to be processed. Instructions for the first thread remain on CPU while the second thread is activated. In some embodiments, this operation may be omitted.

Continuing operations of the method may depend on a determination if the value of the condition variable has changed (block 706). In the present embodiment, as part of the MWAIT instruction, the value at the address included in the MWAIT instruction (the address of the condition variable) is monitored for changes. If a change in the value of the condition variable is detected, then the method moves to block 708 to decrement a count value. If not, then the method returns to block 704 to determine if the time out period has elapsed.

After determining that the value of the condition variable has changed within the timeout period, a count value is decremented (block 708). In the current embodiment, upon a successful execution of the MWAIT instruction (e.g., the value of the condition variable changed within the time out period), a count value is decremented. The count value corresponds to the count value described in block 606 of Method 600 in FIG. 6. In the current embodiment, a lower count value indicates more frequent occurrences of successful MWAIT instructions. It is contemplated that, in other embodiments, the count value may be incremented in response to a successful execution of an MWAIT instruction and, therefore, higher values of the count value indicate more frequent occurrences of successful MWAIT instructions. In addition, in some embodiments, a minimum count value may be implemented, such that the count value is not decremented further upon reaching the minimum count value.

The first thread is reactivated (block 710). Control Circuitry 310, in the illustrated embodiment, deactivates the second thread (if active), and activates the first thread, including the instruction that accesses the condition variable. In some embodiments, if the second thread is active, Control Circuitry 310 may wait for a suitable time to deactivate the second thread, such as, for example, after an executing instruction retires or upon reaching an instruction that may have a scheduling hazard. In other embodiments, the second thread may be deactivated once the first thread is ready to be activated. The method ends in block 715.

After determining, in block 704, that the value of the condition variable has not changed within the timeout period, the count value is incremented (block 712). In the current embodiment, Control Circuitry 310 increments the count value upon a determination that the MWAIT instruction was unsuccessful (e.g., the condition value did not change before the time out period elapsed). A higher count value may indicate more frequent occurrences of unsuccessful MWAIT instructions, thereby suggesting that utilization of the MWAIT instruction is not benefitting performance. As described in block 708, it is contemplated that, in other embodiments, the count value may be decremented in response to an unsuccessful execution of an MWAIT instruction and, therefore, lower values of the count value indicate more frequent occurrences of unsuccessful MWAIT instructions. Additionally, in some embodiments, a maximum count value may be implemented, such that the count value is not incremented further upon reaching the maximum count value. Use of minimum and maximum count values may reduce a time required to disable use of the MWAIT instruction. For example, if the threshold value (from block 606) is 10 and the minimum count value is 5, then if 10 successful MWAIT instructions are followed by 5 unsuccessful MWAIT instructions, the MWAIT instruction may not be used at a next access of the condition variable. Without the minimum value, 10 occurrences of unsuccessful MWAIT instructions would be needed.

The SLEEP process is performed (block 714). In the current embodiment, Control Circuitry 310 responds to the unsuccessful MWAIT instruction by performing the SLEEP process as described in block 610 of Method 600. The first thread is taken off CPU, allowing a different thread to utilize the core resources being used by the first thread. Further details of the SLEEP process are described below. Method 700 ends in block 715.

It is noted that the method illustrated in FIG. 7 is an example for demonstrating the disclosed concepts. Operations are illustrated as occurring in a sequential fashion. In other embodiments, however, some of the operations may be performed in parallel or in a different sequence. Additional operations may be included in some embodiments.

Figure 8:
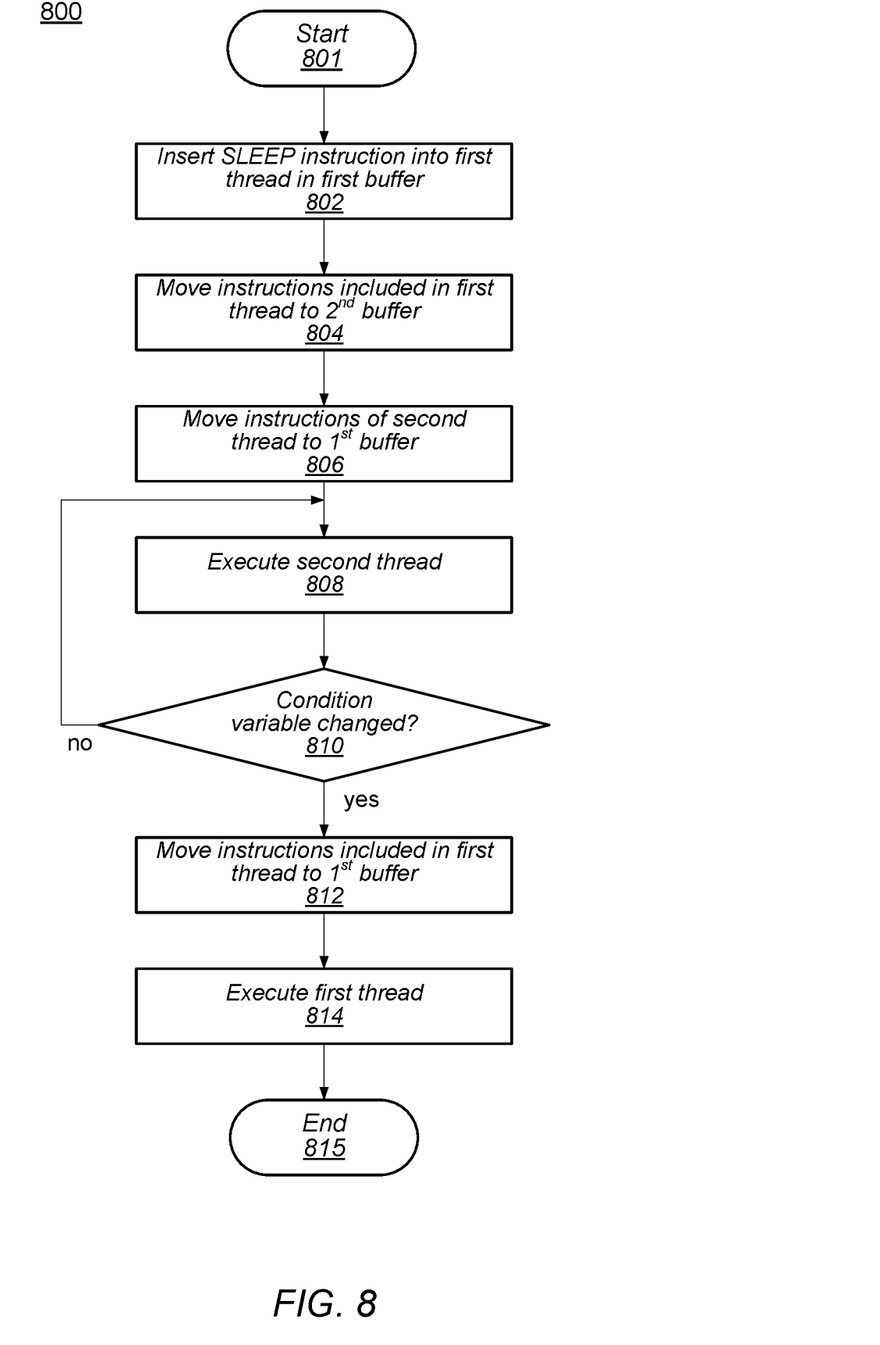
FIG. 8 shows a flow diagram of an embodiment of a method for halting execution of instructions in a first thread and executing instructions in a second thread.

Turning now to FIG. 8, a flow diagram illustrating an embodiment of a method for halting execution of instructions in a first thread and executing instructions in another thread is shown. Method 800 may correspond to block 610 of Method 600 and/or to block 714 of Method 700. Method 800 may be applied to a processing pipeline, such as, e.g., Processing Pipeline 300 in FIG. 3. Referring collectively to Processing Pipeline 300 in FIG. 3 and the flow diagram of FIG. 8, method 800 begins in block 801.

A SLEEP instruction is inserted into a first thread in a first buffer (block 802). In the illustrated embodiment, after a determination that the first thread is dependent upon a condition variable, Control logic, such as, e.g., Control Circuitry 310, inserts a SLEEP instruction into Pick Queue 307 before an instruction included in the first thread that accesses the condition variable. The SLEEP instruction, when executed, causes Control Circuitry 310 to take the first thread off CPU.

Instructions included in the first thread are moved to a second buffer (block 804). Execution of the SLEEP instruction causes Control Circuitry 310 to copy instructions of the first thread from Pick Queue 307 and Fetch Buffer 305 to a sleep buffer, such as, for example, Sleep Buffer 405 in FIGS. 4 and 5. Memory locations in Fetch Buffer 305 and Pick Queue 307 that held the instructions of the first thread may be identified as being available after these instructions have been copied to Sleep Buffer 405.

Instructions from a second thread are stored in the first buffer (block 806). After the locations in Fetch Buffer 305 and Pick Queue 307 have been identified as being available, Control Circuitry 310 may begin fetching and decoding instructions for a second thread. Fetched instructions are stored in Fetch Buffer 305 and decoded instructions are stored in Pick Queue 307.

Upon storing instructions in the first buffer, instructions of the second thread may be executed (block 808). After at least one instruction of the second thread is stored in Pick Queue 307, the second thread may be activated for execution in Execution Unit 330. With the first thread taken off CPU, a second thread may be put on CPU for execution while the first thread waits for the value of the condition variable to be updated. It is noted that the "second thread" referred to in FIG. 8 does not correspond to the "second thread" referred to in FIG. 7.

Further operations of Method 800 may depend on a value of the condition variable (block 810). The condition variable, in the present embodiment, is monitored to detect a change in its value. Forms of monitoring may include, for example, one or more interrupts triggered by an event that results in a change to the value of the condition variable, or a periodic access to the address of the condition value to compare a current value to a previous value. Control Circuitry 310 may also monitor an elapsed time from executing the SLEEP instruction to detecting the change in value of the condition variable. Control Circuitry 310 may then update a count value, such as, e.g., the count value referred to in Method 600 and Method 700, dependent upon the monitored elapsed time. If the value has changed, then the method moves to block 812 to move the first thread back on CPU. Otherwise, the method returns to block 808 to continue executing instructions of the second thread.

After detecting a change in the value of the condition variable, instructions of the first thread are moved back into the first buffer (block 812). In the illustrated embodiment, Control Circuitry 310 puts the first thread back on CPU after a determination that the value of the condition variable has changed. In some embodiments, the first thread may be put back on CPU, replacing the second thread or another thread currently on CPU that has a lower priority than the second thread. In other embodiments, the second thread or other thread on CPU may continue to execute until reaching a suitable stopping point, at which time the stopped thread is taken off CPU and the first thread is put on CPU.

Upon storing instructions back into the first buffer, instructions of the first thread may be executed (block 808). After at least one instruction of the first thread is stored in Pick Queue 307, Execution Unit 330 may begin executing instructions of the first thread, including at least one instruction that accesses the condition variable with the updated value.

It is noted that the method illustrated in FIG. 8 is merely an example. Some operations may be performed in a different sequence or in parallel. Additional operations may be included in some embodiments.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
 a control circuit configured to:
  store, in a pick queue, a plurality of instructions included in a first thread of a plurality of threads, wherein a first instruction of the plurality of instructions depends on an update to a condition variable; and
  based on a number of times the condition variable has failed to update within a particular amount of time, selectively add a wait instruction to the pick queue before the first instruction; and
 an execution unit configured to delay execution of the first instruction for the particular amount of time in response to executing the wait instruction; and
 wherein the control circuit is further configured to, in response to a determination that the condition variable is not updated during the particular amount of time, modify a count value that is indicative of the number of times the condition variable has failed to update within the particular amount of time.

2. The apparatus of claim 1, wherein the control circuit is further configured to add a sleep instruction to the pick queue before the first instruction in response to the determination that the condition variable is not updated during the particular amount of time.

3. The apparatus of claim 2, wherein the control circuit is further configured to move the plurality of instructions of the first thread from the pick queue to a sleep buffer in response to an execution of the sleep instruction.

4. The apparatus of claim 3, wherein the control circuit is further configured to move a plurality of instructions included in a second thread of the plurality of threads to the pick queue in response to the move of the plurality of instructions of the first thread.

5. The apparatus of claim 4, wherein the execution unit is further configured to execute one or more instructions of the second thread.

6. The apparatus of claim 3, wherein the execution unit is further configured to:
 move the plurality of instructions of the first thread from the sleep buffer back to the pick queue in response to a determination that the condition variable has been updated; and
 execute one or more instructions of the first thread.

7. The apparatus of claim 1, wherein the condition variable is configured to be updated in response to receiving data via a network interface.

8. A method comprising:
 storing in a pick queue, by a control circuit, a plurality of instructions included in a first thread of a plurality of threads, wherein a first instruction of the plurality of instructions depends on an update to a condition variable;
 based on a number of times the condition variable has failed to update within a particular amount of time, suspending, by an execution unit, execution of the first instruction for the particular amount of time; and incrementing, by the control circuit, a count value in response to determining that the condition variable is not updated within the particular amount of time; and wherein the count value is indicative of the number of times the condition variable has failed to update within the particular amount of time.

9. The method of claim 8, further comprising executing, by the execution unit, one or more instructions from a second thread of the plurality of threads while execution of the first instruction of the first thread is suspended.

10. The method of claim 8, further comprising adding, by the control circuit, a sleep instruction to the pick queue before the first instruction in response to determining that the condition variable is not updated within the particular amount of time.

11. The method of claim 10, further comprising moving, by the control circuit, the plurality of instructions of the first thread from the pick queue to a sleep buffer in response to executing, by the execution unit, the sleep instruction.

12. The method of claim 11, further comprising:
moving, by the control circuit, a plurality of instructions included in a second thread of the plurality of threads to the pick queue in response to the move of the plurality of instructions of the first thread; and
executing, by the execution unit, one or more instructions of the second thread.

13. The method of claim 11, further comprising:
moving, by the control circuit, the plurality of instructions of the first thread from the sleep buffer back to the pick queue in response to determining that the condition variable has been updated; and
executing, by the execution unit, one or more instructions of the first thread.

14. The method of claim 8, further comprising updating the condition variable in response to receiving input from a user interface.

15. An apparatus, comprising:
a control circuit configured to store, in a pick queue, a plurality of instructions included in a first thread of a plurality of threads, wherein a first instruction of the plurality of instructions depends on an update to a condition variable; and
an execution unit configured to, based on a number of times the condition variable has failed to update within a particular amount of time, suspend execution of the first instruction for the particular amount of time; and
wherein the control circuit is further configured to park the first thread in response to a determination that the condition variable is not updated within the particular amount of time.

16. The apparatus of claim 15, wherein to suspend the execution of the first instruction, the control circuit is further configured to determine that a count value is less than a threshold value.

17. The apparatus of claim 16, wherein the control circuit is further configured to increment the count value in response to a determination that the condition variable is not updated within the particular amount of time.

18. The apparatus of claim 15, wherein to suspend the execution of the first instruction, the control circuit is further configured to insert a wait instruction in the pick queue before the first instruction.

19. The apparatus of claim 15, wherein to park the first thread, the control circuit is further configured to move the plurality of instructions of the first thread from the pick queue to a sleep buffer.

20. The apparatus of claim 15, wherein the condition variable is configured to be updated in response to a measurement in a sensor circuit reaching a particular value.

* * * * *